(12) United States Patent
Pefkianakis et al.

(10) Patent No.: US 10,972,155 B2
(45) Date of Patent: Apr. 6, 2021

(54) ACCESS POINT SELECTION (71) Applicant: HEWLETT PACKARD ENTERPRISE DEVELOPMENT LP, Houston, TX (US)

(72) Inventors: Ioannis Pefkianakis, Palo Alto, CA (US); Sanjib Sur, Ripon, WI (US); Yunze Zeng, Palo Alto, CA (US)

(73) Assignee: Hewlett Packard Enterprise Development LP, Houston, TX (US)

( * ) Notice: Subject to any disclaimer, the term of this patent is extended or adjusted under 35 U.S.C. 154(b) by 0 days.

(21) Appl. No.: 15/775,907

(22) PCT Filed: Nov. 25, 2015

(86) PCT No.: PCT/US2015/062759
§ 371 (c)(1),
(2) Date: May 14, 2018

(87) PCT Pub. No.: WO2017/091232
PCT Pub. Date: Jun. 1, 2017

(65) Prior Publication Data
US 2018/0331729 A1    Nov. 15, 2018

(51) Int. Cl.
*H04B 7/0417* (2017.01)
*H04W 48/20* (2009.01)
(Continued)

(52) U.S. Cl.
CPC ......... *H04B 7/0417* (2013.01); *H04B 7/0452* (2013.01); *H04B 7/0456* (2013.01); *H04B 7/0617* (2013.01); *H04W 48/20* (2013.01)

(58) Field of Classification Search
None
See application file for complete search history.

(56) References Cited

U.S. PATENT DOCUMENTS

| 8,699,602 | B2 * | 4/2014 | Chen | H04B 17/24 375/267 |
| 8,824,307 | B2 * | 9/2014 | Zhang | H04W 36/0069 370/241 |

(Continued)

FOREIGN PATENT DOCUMENTS

| EP | 1445907 A2 * | 8/2004 | H04L 1/20 |
| JP | 2014502812 A | 2/2014 | |

(Continued)

OTHER PUBLICATIONS

Xie et al., Cross-Cell DoF Distribution—Combating Channel Hardening Effect in Multi-Cell MU-MIMO Networks, Jun. 2015. pdf<br>.*

(Continued)

*Primary Examiner* — Berhanu Tadese
(74) *Attorney, Agent, or Firm* — International IP Law Group, PLLC (57) ABSTRACT

In some examples, a system can include a processing resource and a memory resource. The memory resource can store machine readable instructions to cause the processing resource to: (1) collect feedback from a physical (PHY)-layer of a client at a plurality of access points, before the client is associated with any one of the plurality of access points and (2) select an access point using a client channel correlation value calculated from the PHY-layer feedback, wherein the selected access point serves the client and a client group concurrently using precoding.

12 Claims, 7 Drawing Sheets

(51) Int. Cl.
*H04B 7/0452* (2017.01)
*H04B 7/0456* (2017.01)
*H04B 7/06* (2006.01)

(56) References Cited

U.S. PATENT DOCUMENTS

| | | | | |
|---|---|---|---|---|
| 9,008,210 | B2* | 4/2015 | Seok | H04W 48/10 375/267 |
| 9,094,172 | B2* | 7/2015 | Chen | H04B 17/24 |
| 9,312,929 | B2* | 4/2016 | Forenza | H04W 72/048 |
| 9,369,888 | B2* | 6/2016 | Forenza | H04L 25/0232 |
| 9,420,530 | B1* | 8/2016 | Duxbury | H04W 52/02 |
| 9,736,785 | B2* | 8/2017 | Khojastepour | H04B 7/0413 |
| 9,794,817 | B2* | 10/2017 | Ko | H04B 7/0617 |
| 9,819,403 | B2* | 11/2017 | Forenza | H04B 7/024 |
| 9,826,537 | B2* | 11/2017 | Forenza | H04B 17/318 |
| 9,853,701 | B1* | 12/2017 | Pefkianakis | H04B 7/0617 |
| 9,917,655 | B1* | 3/2018 | Kasapi | H04L 1/0018 |
| 10,051,685 | B1* | 8/2018 | Pefkianakis | H04B 7/0626 |
| 10,090,895 | B2* | 10/2018 | Pefkianakis | H04B 7/0617 |
| 10,200,094 | B2* | 2/2019 | Forenza | H04B 7/0626 |
| 2003/0214928 | A1* | 11/2003 | Chuah | H04L 47/30 370/336 |
| 2004/0151145 | A1* | 8/2004 | Hammerschmidt | H04L 25/0204 370/338 |
| 2004/0151146 | A1* | 8/2004 | Hammerschmidt | H04B 7/0615 370/338 |
| 2005/0208975 | A1* | 9/2005 | Lau | H04B 7/0897 455/562.1 |
| 2006/0256805 | A1* | 11/2006 | Cho | H04B 7/0452 370/431 |
| 2008/0005482 | A1* | 1/2008 | Beers | G06F 12/0831 711/141 |
| 2008/0089396 | A1* | 4/2008 | Zhang | H04B 7/0413 375/220 |
| 2009/0154588 | A1* | 6/2009 | Chen | H04L 1/0026 375/267 |
| 2010/0008406 | A1* | 1/2010 | Sawai | H04B 17/21 375/219 |
| 2010/0111020 | A1* | 5/2010 | Chen | H04W 72/0426 370/329 |
| 2010/0329369 | A1* | 12/2010 | Hou | H04B 7/0452 375/260 |
| 2011/0002371 | A1* | 1/2011 | Forenza | H04B 17/309 375/227 |
| 2011/0003606 | A1* | 1/2011 | Forenza | H04B 7/0417 455/501 |
| 2011/0003608 | A1* | 1/2011 | Forenza | H04B 7/024 455/501 |
| 2011/0044193 | A1* | 2/2011 | Forenza | H04W 24/08 370/252 |
| 2011/0075752 | A1* | 3/2011 | Zheng | H04B 7/0854 375/267 |
| 2012/0093078 | A1* | 4/2012 | Perlman | H04B 7/0626 370/328 |
| 2012/0127948 | A1* | 5/2012 | Chung | H04L 5/0053 370/329 |
| 2012/0163185 | A1* | 6/2012 | Zhang | H04W 36/0069 370/241 |
| 2012/0314570 | A1* | 12/2012 | Forenza | H04B 7/01 370/230 |
| 2013/0135315 | A1* | 5/2013 | Bares | G11B 27/031 345/473 |
| 2013/0136046 | A1* | 5/2013 | Wurm | H04W 52/0225 370/311 |
| 2013/0208604 | A1* | 8/2013 | Lee | H04B 7/0626 370/252 |
| 2013/0217427 | A1* | 8/2013 | Bajko | H04W 48/14 455/507 |
| 2013/0279362 | A1* | 10/2013 | Park | H04W 24/02 370/252 |
| 2013/0286959 | A1* | 10/2013 | Lou | H04L 5/003 370/329 |
| 2014/0161109 | A1* | 6/2014 | Sung | G10L 13/047 370/336 |
| 2014/0185556 | A1* | 7/2014 | Chen | H04L 1/0029 370/329 |
| 2014/0313948 | A1* | 10/2014 | Janis | H04W 48/08 370/280 |
| 2014/0334402 | A1* | 11/2014 | Chen | H04W 72/12 370/329 |
| 2015/0016379 | A1* | 1/2015 | Nam | H04B 7/0619 370/329 |
| 2015/0043482 | A1* | 2/2015 | Choi | H04B 7/0452 370/329 |
| 2015/0223173 | A1* | 8/2015 | Khojastepour | H04B 7/0413 370/278 |
| 2015/0230231 | A1* | 8/2015 | Fornoles, Jr. | H04W 48/20 455/509 |
| 2015/0312015 | A1* | 10/2015 | Chen | H04L 5/0057 370/329 |
| 2016/0019632 | A1* | 1/2016 | Liu | G06Q 30/0635 705/26.81 |
| 2017/0034841 | A1* | 2/2017 | Bethanabhotla | H04L 5/0048 |
| 2018/0083751 | A1* | 3/2018 | Seo | H04L 5/0037 |
| 2018/0124694 | A1* | 5/2018 | Pefkianakis | H04W 48/20 |
| 2018/0159638 | A1* | 6/2018 | Awadin | H04B 17/17 |
| 2018/0212654 | A1* | 7/2018 | Pefkianakis | H04B 7/0417 |
| 2018/0331729 | A1* | 11/2018 | Pefkianakis | H04B 7/0617 |
| 2018/0365975 | A1* | 12/2018 | Xu | G01V 3/12 |
| 2019/0020425 | A1* | 1/2019 | Zhang | H04W 4/027 |
| 2019/0069264 | A1* | 2/2019 | Seth | G01S 5/0289 |

FOREIGN PATENT DOCUMENTS

| | | | | |
|---|---|---|---|---|
| WO | WO-2014003384 | A1* | 1/2014 | H04B 7/0626 |
| WO | WO-2015/088854 | A1 | 6/2015 | |
| WO | WO-2015088854 | A1* | 6/2015 | H04W 72/1205 |
| WO | WO-2017091232 | A1* | 6/2017 | H04W 48/20 |

OTHER PUBLICATIONS

Xie, X et al, "Scalable User Selection for MU-MIMO Networks," Apr1i-May 2014, pp. 808-8'16, http://citeseerx.ist.psu.edu/viewdoc/download?do1='10.1.1.901.4'124&rep=rep1 &type=pdf. (Cited in IDS of May 14, 2018).*

Kyu-Haeng Lee and Chong-Kwon Kim, "User Scheduling for MU-MIMO Transmission with Active CSI feedback," EURASIP Journal on Wireless Communications and Netwofking, 20•1 s, pp. 1-12, Springef. (Cited in IDS of May 14, 2018).*

Intemationai Search Report & Written Opinion recelvec! 1n PCT Application No. PCT/US2015/062759, dated Aug. 19, 2016, •14 pages. (Cited in IDS of May 14, 2018).*

Xie et al., "Cross-Cell DoF Distribution—Combating Channel Hardening Effect in Multi-Cell MU-MIMO Networks", Jun. 2015 (Year: 2015).*

X. Xie et al., Scalable user selection for MU-MIMO networks, IEEE 2014 (Year: 2014).*

Abusubaih et al., "A new access point selection policy for multi-rate ieee 802.11 wlans", International Journal of Parallel, Emergent and Distributed Systems, vol. 23, Issue 4, 2008, pp. 291-307.

Bosch et al., "A network-driven multi-access-point load-balancing algorithm for large-scale public hotspots", In Intelligent Mechanisms for Network Configuration and Security, 2015, pp. 30-42.

Choi et al., "On the performance characteristics of wlans: revisited", Proceedings of the 2005 ACM SIGMETRICS international conference on Measurement and modeling of computer systems, pp. 97-108.

Deek et al., "Intelligent channel bonding in 802.11 n wlans", IEEE Transactions on Mobile Computing, vol. 13, Issue 6, Jun. 2014, 14 pages.

Gong et al., "Dynamic load balancing through association control of mobile users in wifi networks", IEEE Transactions on Consumer Electronics, vol. 54, Issue 2, May 2008, pp. 342-348.

(56) References Cited

OTHER PUBLICATIONS

Halperin et al., "Predictable 802.11 packet delivery from wireless channel measurements", Proceedings of the ACM SIGCOMM 2010 conference, vol. 41, Issue 4, pp. 159-170.
Hsu et al., "Client-ap association for multiuser mimo networks", Department of Computer Science, National Tsing Hua University, Tech. Rep, 2014, 30 pages.
Lee et al., "Available bandwidth-based association in ieee 802.11 wireless lans", In Proceedings of the 11th international symposium on Modeling, analysis and simulation of wireless and mobile systems, 2008, pp. 132-139.
Murty et al., "Designing high performance enterprise wi-fi networks", NSDI'08 Proceedings of the 5th USENIX Symposium on Networked Systems Design and Implementation, 2008, pp. 73-88.
Nicholson et al., "Improved access point selection", In Proceedings of the 4th international conference on Mobile systems, applications and services, 2006, pp. 233-245.
Pefkianakis et al., "Mimo rate adaptation in 802.11 n wireless networks", In Proceedings of the sixteenth annual international conference on Mobile computing and networking, ACM, 2010, pp. 257-268.
R. O. Schmidt, "Multiple emitter location and signal parameter estimation", IEEE Transactions on Antennas and Propagation, vol. 34, Issue 3, Mar. 1986, pp. 276-280.
Rayanchu et al., "Fluid: improving throughputs in enterprise wireless lans through flexible channelization", IEEE Transactions on Mobile Computing, vol. 11, Issue 9, 2012, pp. 1455-1469.
Rozner et al., "Traffic-aware channel assignment in enterprise wireless lans", In Network Protocols, ICNP 2007, IEEE International Conference on, 2007, pp. 133-143.
Sen et al., "Accurate: Constellation based rate estimation in wireless networks", In NSDI, 2010, 15 pages.
Shrivastava et al., "802.11 n under the microscope", In Proceedings of the 8th ACM SIGCOMM conference on Internet measurement, ACM, 2008, pp. 105-110.
Vutukuru et al., "Cross-layer wireless bit rate adaptation", ACM Sigcomm Computer Communication Review, vol. 39(4), 2009, 12 pages.
Wong et al., "Robust rate adaptation for 802.11 wireless networks", In Proceedings of the 12th annual international conference on Mobile computing and networking, ACM, 2006, pp. 146-157.
Xiong et al., "Arraytrack: A Fine-grained indoor location system", Proceedings of the 10th USENIX conference on Networked Systems Design and Implementation, 2013, pp. 71-84.
Xu et al., "Selecting a preferable access point with more available bandwidth", In Communications (ICC), 2013 IEEE International Conference on, pp. 6311-6316.
Zhu et al., "A user-centric network management framework for high-density wireless lans", Proceedings of the 11th IFIP/IEEE international conference on Symposium on Integrated Network Management, 2009, pp. 218-225.
International Search Report & Written Opinion received in PCT Application No. PCT/US2015/062759, dated Aug. 19, 2016, 14 pages.
Kyu-Haeng Lee and Chong-Kwon Kim, "User Scheduling for MU-MIMO Transmission with Active CSI Feedback," EURASIP Journal on Wireless Communications and Networking, 2015, pp. 1-12, Springer.
Xie, X et al., "Cross-Cell DoF Distribution: Combating Channel Hardening Effect in Multi-Cell MU-MIMO Networks," Jun. 2015, pp. 337-346, https://dl.acm.org/citation.cfm?id=2746290.
Xie, X et al., "Scalable User Selection for MU-MIMO Networks," Apr.-May 2014, pp. 808-816, http://citeseerx.ist.psu.edu/viewdoc/download?doi=10.1.1.901.4124&rep=rep1&type=pdf.

* cited by examiner

ACCESS POINT SELECTION

BACKGROUND

In computer networking, a wireless access point (AP) is a device that allows wireless devices to connect to a wired network using wireless fidelity (Wi-Fi), or related standards. Precoding, or more specifically beamforming, technology allows an access point to support multiple, concurrent data streams to a group of clients. Precoding allows multiple data streams to be emitted from a transmit antenna with independent and appropriate weightings such that the link throughput is maximized at the receiver output.

BRIEF DESCRIPTION OF THE DRAWINGS

Certain examples are described in the following detailed description and in reference to the drawings, in which.

DETAILED DESCRIPTION OF SPECIFIC EXAMPLES

An access point may benefit from selecting a group of clients whose wireless channels are orthogonal. The selection of a group of clients with orthogonality may increase throughput and capacity gains. As used herein, the term orthogonal means that signals arrive from directions angularly positioned from each other relative to a transmit or receive antenna, for example, on an access point. Orthogonality can be beneficial for clients using precoding because concurrent transmissions from an access point to orthogonal clients can reduce inter-client interference as fewer signals overlap and interfere.

As used herein, precoding is a method of spatial signal processing by which the multiple antenna transmitters can null multiuser interference signals in wireless communications. In one example, precoding can be done using a precoding algorithm, such as Zero-forcing beamforming (ZFBF). One benefit of precoding allows for a client to decode its intended packet and ignore the interfering signals from neighboring devices, i.e. interference nulling.

In one example, by using a multi-user multiple input multiple output ("Mu-MIMO") setting, clients can measure physical (PHY) layer information, such as the channel state information (CSI) or other similar information to describes how a signal propagates from the transmitter to the receiver and represents the combined effect of, for example, scattering, fading, and power decay with distance. In multi-user MIMO (Mu-MIMO), for example, the data streams are intended for different users and some measure of the total throughput can be maximized. This PHY-layer information can be returned to the access point for analysis prior to association of an access point to a client. The access point can use the PHY-layer information to precode data packets.

When signals from different clients overlap in space, the client's channels can be correlated. Consequently, concurrent service may provide poor performance due to interference between signals from the client's. Spatial distribution of clients can be estimated using algorithms that use PHY-layer feedback to identify the signal's angle of arrival and the signal power. This may be performed even when clients are not already associated with an access point. An example algorithm for determining spatial distribution could include multiple signal classification (MU-SIC).

In the present disclosure, the ability of an access point, a controller, or a combination of the two, to implement the disclosed techniques allows MU-MIMO to achieve higher throughput gains. These gains in throughput can be in part attributed to an increased focus on the creation of channels to the clients of an MU-MIMO group that are orthogonal and uncorrelated.

Figure 1:
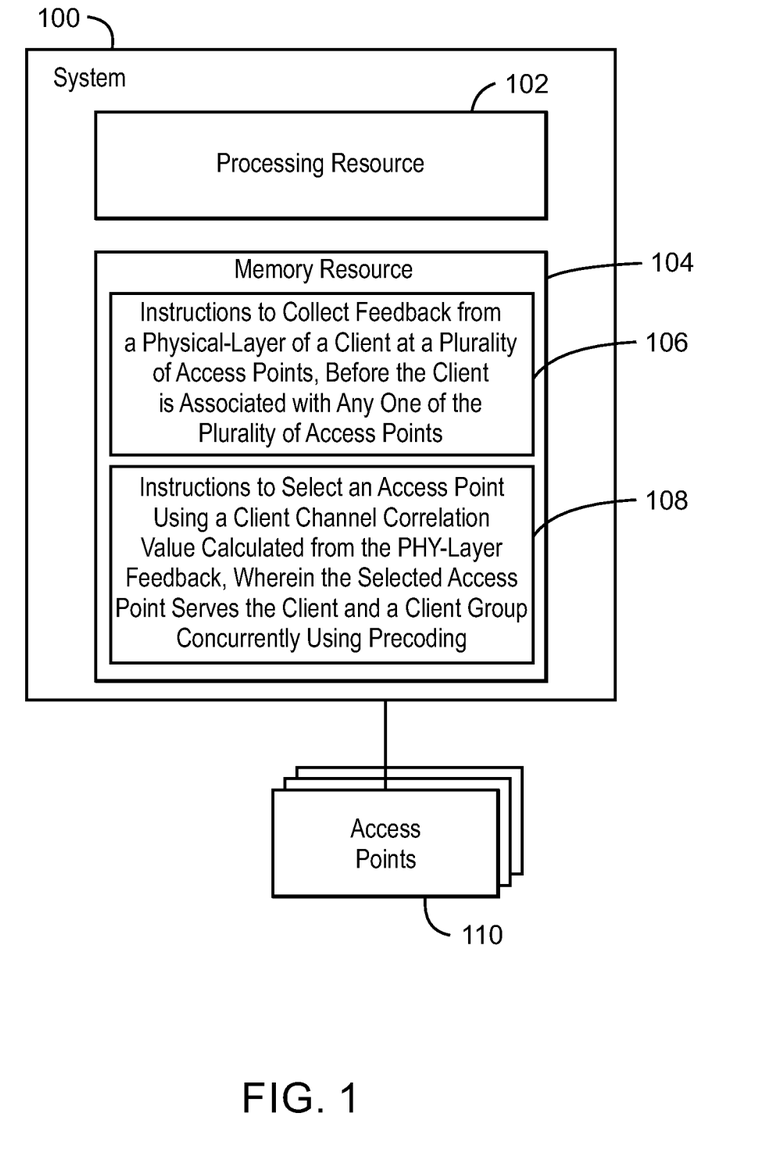
FIG. 1 is an example of a system for selecting an access point for a wireless network.

FIG. 1 is an example of a system 100 for selecting an access point for a wireless network. The system 100 includes a processing resource 102 such as a central processing unit (CPU) that is configured to execute stored instructions, as well as a memory resource 104 that stores instructions that are executable by the processing resource 102. The memory resource 104 can store instructions to collect feedback from a physical (PHY)-layer of a client at a plurality of access points, before the client is associated with any one of the plurality of access points. The memory resource can also store instructions to select an access point using a client channel correlation value calculated from the PHY-layer feedback, wherein the selected access point serves the client and a client group concurrently using precoding.

The access point 110 that is selected may already be associated with a client or a number of clients that are substantially orthogonal to, e.g. the clients have the least channel correlation with, the new client. In an example, the client channel correlation value can be calculated with a signal space distribution that is estimated from the PHY-layer feedback. The client channel correlation value is a value that can be obtained from quantifying and comparing a signal overlap from different client signals. These client signals come from different clients that are being concurrently served by an access point. The client channel correlation value can also be calculated from client signal strength, traffic load, as well as from the PHY-layer feedback. The signal space distribution can be a quantified distribution of how signals overlap in space, either angularly upon arrival, sharing of a transmission path that could lead to interference, or other measured distributions of signals. The signal space distribution can inform the client channel correlation value if the signal space distribution shows an overlap in signals that could cause interference.

The block diagram of FIG. 1 is not intended to indicate that the system 100 is to include all of the components shown in FIG. 1. Further, the system 100 may include any number of additional components not shown in FIG. 1, depending on the details of the specific implementation.

Figure 2:
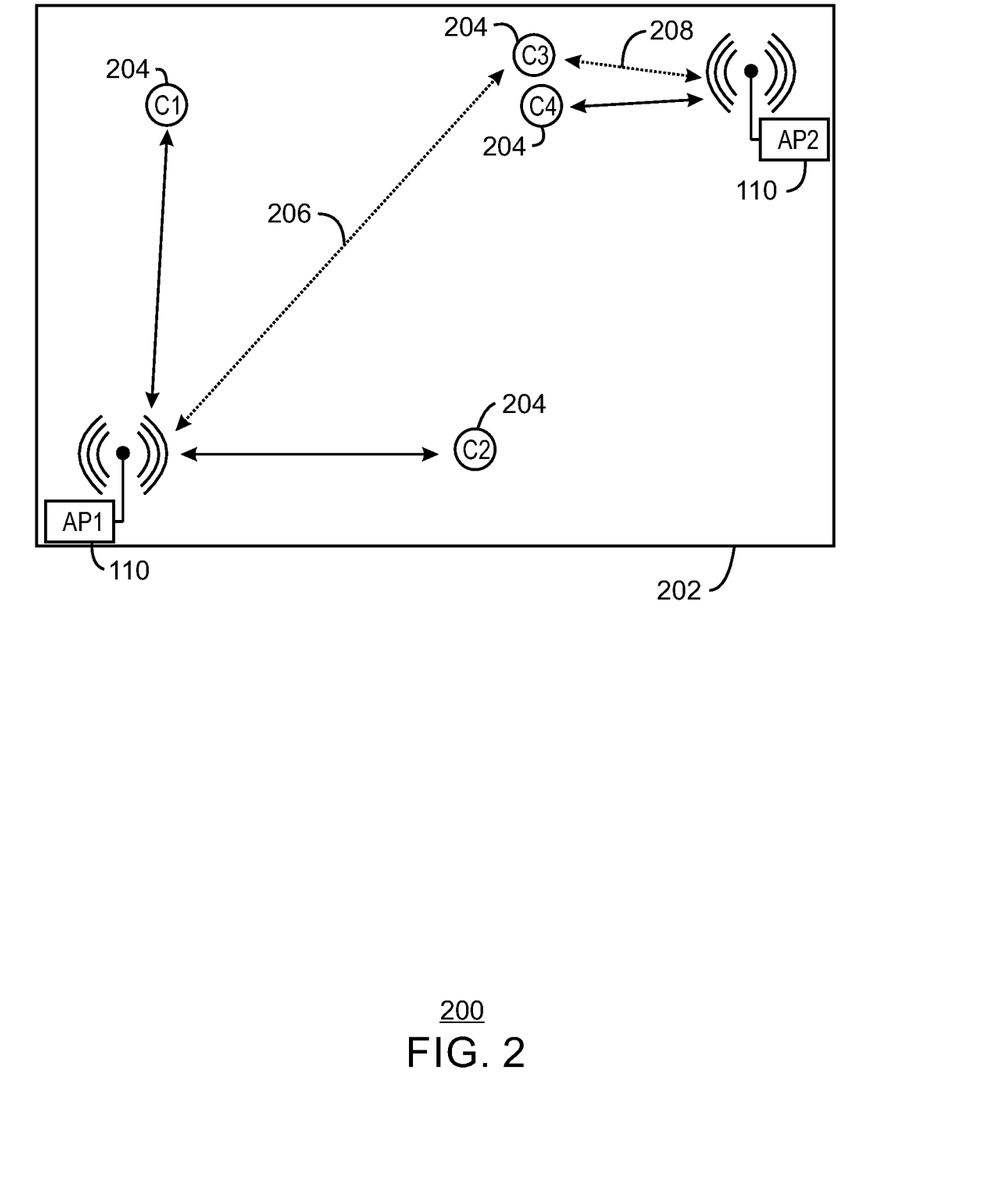
FIG. 2 is an example drawing of a space with two access points and their clients.

FIG. 2 is an example drawing 200 of a space 202 with two access points 110 and their clients 204. The drawing illustrates benefits of the techniques disclosed herein.

In addition to the two access points 110 (AP1 and AP2), the space 202 includes four clients 204: C1, C2, C3, and C4. Each client 204 may associate with an access point to create a wireless network. Often, this association is based on signal strength with varies largely due to proximity to a particular access point 110.

In the example shown in FIG. 2, the proximities are shown between the clients 204 and associated access points 110. Client C1 204 associates with access point AP1 110 rather than access point AP2 110 due a stronger received signal strength indicator (RSSI) with AP1, e.g., from the closer proximity to AP1. Likewise, client C4 204 associates with access point AP2 110 due to a stronger RSSI with the closer access point AP2 110. When multiple clients 204 associate with the same access point 110, the benefits of concurrent service by the access point, including service using precoding, can be realized. As used herein, concurrent service is the providing of wireless service to clients from access points simultaneously with coding such as precoding or a multi-user multi-input multi-output technology.

Focusing solely on proximity, or RSSI, to determine the access point 110 that may associate with a client 204, may lead to signal interference between clients 204 when serving clients 204 concurrently. For example, when clients 204 C3 and C4 are both associated with AP2 110, for example, due to the strength of the RSSI, the network throughput could be reduced due to signal interference due potentially to their proximity affecting their signal overlap. Using the presently disclosed techniques for access point selection, factors other than signal strength or signal to noise ratio, can be considered when assigning clients 204 to an access point 110 or to a client group associated with an access point 110.

To illustrate the selection of client using factors other than the distance dominated metric of signal strength, the client C3 204 may not choose its closest access point due to lower throughput due to signal overlap. Indeed, the distance 206 from client C3 204 to access point AP1 110 exceeds the distance 208 from client C3 204 to access point AP2 110. If the client C3 204 has not yet joined the network, but is attempting to associate with an access point, using previous techniques, based on signal strength alone, the client C3 204 may automatically associate with access point AP2 110. However, the proximity of client C3 204 to client C4 204, and the close angular relationship between client C3 204 and client C4 204 relative to the access point AP2 110, could lead to interference that would reduce throughput. Signal interference can be estimated through high channel correlation, which if present, can increase transmission issues such as packet error rate. As used herein, high channel correlation can refer to the client channel correlation value being relatively high to indicate that the channels may be very likely to interfere. As used herein, low channel correlation can refer to the client channel correlation value being relatively low to indicate that the channels are less likely to interfere. As signal orthogonality can be caused by variations in the angular relationship compared to other signals communicating with the access point, higher signal orthogonality can decrease the channel correlation and decrease the chance of channel interference.

In an example where concurrent service is provided to multiple clients 204 associated to a single access point 110, assigning client C3 204 to access point AP1 110 may increase the total network throughput. In one example, although the RSSI of client C3 204 to access point AP1 110 is likely weaker than the RSSI to access point AP2 110, there could be greater orthogonality between the clients 204 C1 and C2 associated with access point AP1 110 due to client C1 204 and C2 204 relative positions. The physical separation and difference in angle between clients C1, C2, and C3 204 relative to access point AP1 110 could decrease the channel correlation between the clients and allow higher throughput when compared to the throughput for concurrently served clients C3 and C4 204 if they were associated with AP2 110. Despite the lower signal strength client C3 204 could receive if it associated with AP1 110 over AP2 110, the association of client C3 204 with access point AP1 110 can increase throughput when compared to throughput achievable if client C3 204 remained associated with AP2 110.

In the present disclosure, the selection of access points takes into account PHY-layer information and factors that information into a decision as to the access point 110 a client 204 selects. While PHY-layer feedback such as CSI can be used, other information including signal to noise ratio and traffic load feedback of a particular access point 110 may also be taken into account to maximize throughput.

Figure 3:
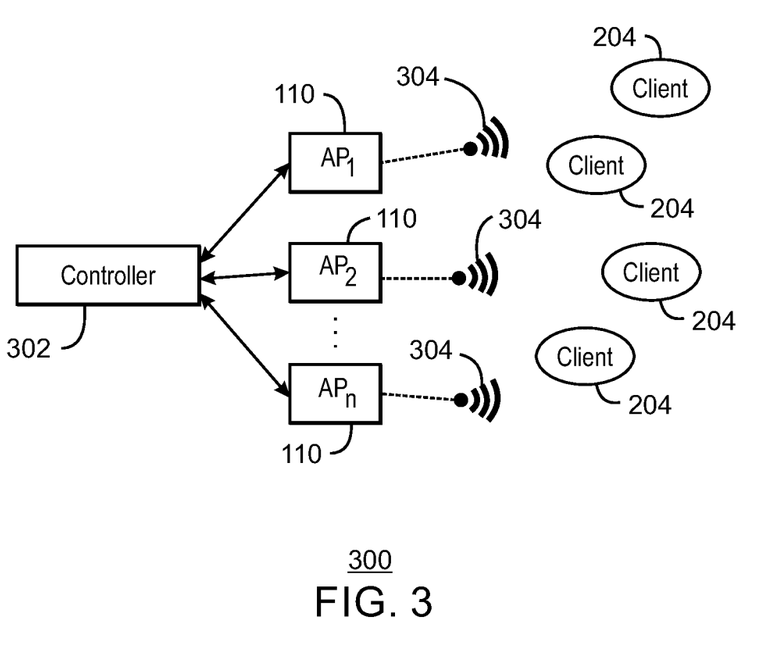
FIG. 3 is a block diagram of multiple example access points and multiple example clients.

FIG. 3 is a block diagram of multiple example access points and multiple example clients. Like numbered items are as described in FIG. 2. The arrangement 300 shown may include a controller 302. The controller 302 may be a separate network device from the access points 110 AP1, AP2 . . . APn, as shown in FIG. 3. In an example, the controller 302 can be integrated into an access point 110. The controller 302 may manage and instruct multiple access points 110. The controller 302 can instruct and manage the collection of information for association of the access points 110 to clients 204. The controller 302 can instruct each access point 110 to send out probes 304 that prompt a response by clients 204 that have not yet associated with one of the access points 110. The probes 304 can take any number of forms including the sending of NULL data packets from the access points 110.

One measure of throughput focuses on throughput of the network, e.g., the throughput affecting the connected or controlled clients 204 and access points 110 as a whole. If a client 204 responds to the probe of the access point 110, information from the client's response can be used to aid in selecting which client and access point 204 should associate for greatest network-wide throughput. The client response can include a client's acknowledgement (ACK) packet, for example. The information a controller may derive from a client 204 response can include PHY-layer feedback such as channel state information.

The PHY-layer feedback obtained from multiple access points 110 can all be sent to the controller 302. The controller 302 may then estimate, on a network level, the relative spatial distributions of the incoming signals to infer orthogonality and channel correlation. As shown in FIG. 2, when signals from different clients 204 have a similar angular relationship to an AP, then their channels may be correlated. Consequently techniques using precoding for concurrent service can have poor performance.

Spatial distribution estimations do not require clients 204 to be associated with an access point 110 as spatial distribution can be estimated using algorithms which use PHY-layer feedback to identify the signal's angle of arrival and the signal power. An example algorithm could include multiple signal classification (MU-SIC).

Using the PHY-layer feedback gathered before a client 204 associates with an access point 110 allows the controller to associate the client 204 with the access point 204 with the fewest other client channels that overlap with the channels the client 204 may use. As discussed, the controller can also include a client's signal strength and the traffic load of the various access points 110. As this system and controller 302 gathers and uses the PHY-layer information prior to the client associating with the access point 110, this process can be faster than previous approaches. For example, techniques which use receiver-channel state information (CSI) or very high throughput (VHT) compressed beamforming feedback, since these approaches involve clients associating with the new access point prior to determining orthogonality or channel correlation.

Figure 4:
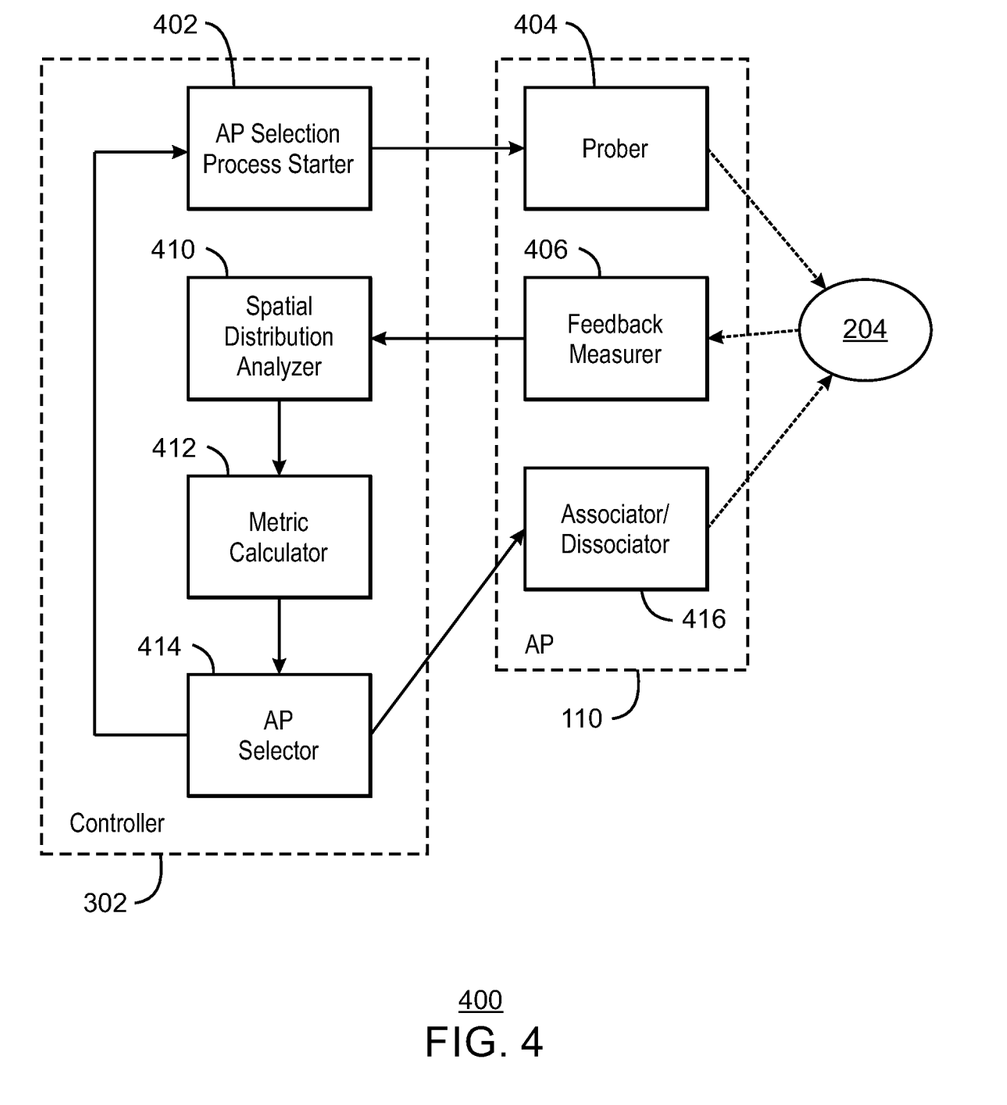
FIG. 4 is block diagram of example access points, controllers, and modules on each.

FIG. 4 is block diagram of example access points, controllers, and modules on each. Like numbered items are as described here and as in FIG. 2 and FIG. 3.

The techniques herein disclosed can be implemented entirely on the infrastructure side, including the controller 302 and access point 110. When there are multiple access points, all of the access points, e.g. suitable base stations, can be connected to the controller 302. The controller 302 is typically connected through wired communicative connection such as Ethernet with the access points 110 and collects at least PHY-layer feedback, traffic load feedback, and signal to noise ratio feedback in order to perform the access point selection for the clients.

An access point (AP) selection module in the controller can start the AP selection process. This selection process can be triggered in a number of situations. For example, the selection process may be triggered if a new client 204 requests connect*ion with the APs of the wireless network. The selection process may be triggered if the wireless channel significantly changes for a particularly client as determined through the PHY-layer feedback of the client. The selection process can be triggered if the traffic load of an AP changes. Each of these triggers can be detected by the AP selection process starter 402 and cause the controller 302 to send a message to the AP 110. While one AP 110 is shown the controller 302 can be controlling, collecting, and sending messages to multiple APs 110.

The message sent can include a request that the APs 110 send probing frames to all potential clients. The probing frames, or probes, can be sent periodically, and may also be sent if one of the selection processes is triggered again by the AP selection process starter 402. The probing frames can be sent by the prober 404 which handles the AP's probing process. In one example, once the AP 110 gets the probing message from the controller 302, the prober 404 probes for clients to collect client information like PHY-layer feedback. For probing, the prober 404 of the AP 110 can transmit NULL data frames, which are short frames with no data payload. If the client 204 receives the NULL data frame, it can respond with an acknowledgement (ACK) frame for each NULL data frame it receives.

The AP 110 can include a feedback measurer 406 to measure PHY-layer feedback received from a client based on the ACK frame the AP 110 receives. When using orthogonal frequency-division multiplexing (OFDM) and the PHY layer, a client channel can be divided into multiple subcarriers with independent channel characteristics. CSI describes the channel conditions for each subcarrier. In a concurrent serving system such as a multi-input multi-output (MIMO) system, the channel can be modeled as shown in the following equation.

$$y = Hx + n$$

In this equation, y is the received signal vector, x is the transmitted signal vector, n is white Gaussian noise vector and H is the channel matrix. In this example, CSI provides an estimation of the channel matrix H. In this example, CSI can be an m*n*w complex matrix for a MIMO system which has 'm' transmit antennas, 'n' receiver antennas and 'w' subcarriers. These relationships can aid the feedback measurer 406 to measure the PHY-layer feedback such as CSI information and pass this information on to the controller 302.

At the controller 302, the spatial distribution analyzer 410 collects the CSIs for each AP 110 and for each client 204 and estimates the spatial distribution of the signal. Signal space distribution can be estimated using algorithms such as multiple signal classification (Mu-SiC), which uses CSI feedback to identify a signal's angle of arrival and the signal power. This information can be passed from the spatial distribution analyzer 410 to the metric calculator 412.

The metric calculator 412 can use the information obtained and analyzed by the controller 302 to assign a client 204 to an AP 110. This assignment involves a calculation to determine which AP 110 association could lead to a high AP 110-client 204 signal strength, i.e., the signal-to-noise ratio (SNR) is high. This assignment could also involve a calculation of which AP 110 association will lead to a client's signal not overlapping with the signals of the clients 204 already associated to the AP 110. To calculate, or at least estimate, potential signal overlap the controller 302 estimates the spatial distribution of the client's signal, considers SNR, and traffic load.

Based on the findings of the metric calculator 412, the controller 302 AP selector 414 associates a client 204 with the AP 204 with the best calculated throughput potential. This calculated throughput is calculated by the metric calculator 412 based on the spatial distribution of the client's signal, the SNR, and traffic load. An example of considering traffic load can include limiting the assignment of clients 204 to APs 110 that are already overloaded.

When the controller 302 completes the AP selection, the controller 302 can notify an AP 110 that it has been selected to serve a client 204. The controller 302 can also notify an AP 110 that was previously serving the client 204, if any, of the change in association. The associator/dissociator 416 can receive these messages from the controller 302 and enact the associations between the AP 110 and the clients 204. In an example, the associator/dissociator 416 can be a Medium access control (MAC) sub-layer management entity (MLME) service stored and enacted by the AP 110.

Figure 5:
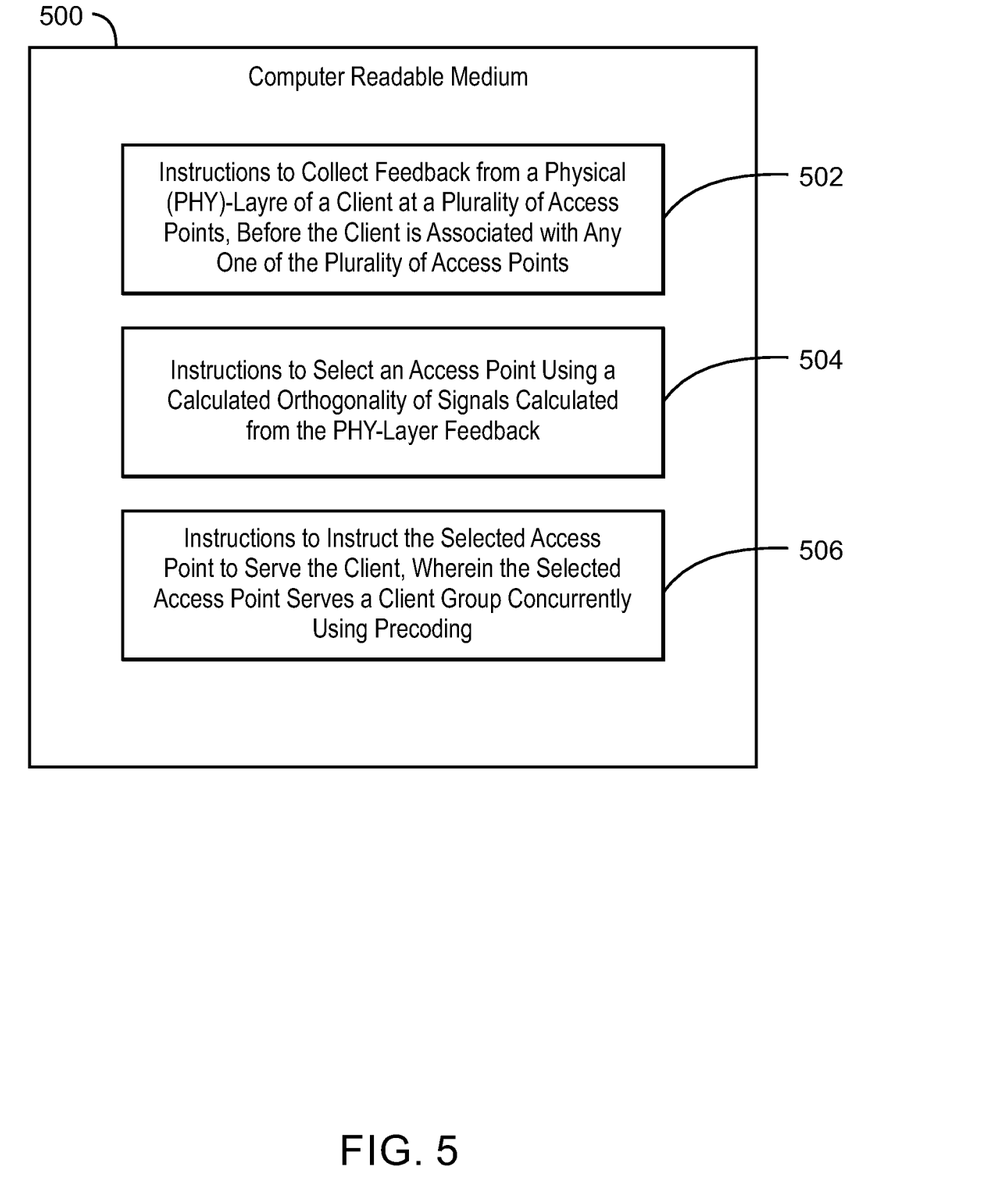
FIG. 5 is a block diagram of an example non-transitory, computer-readable medium comprising code that when executed by a processor selects an access point for a wireless network.

FIG. 5 is a block diagram of an example non-transitory, computer-readable medium comprising code that when executed by a processor selects an access point for a wireless network. The computer-readable medium 500 can be accessed by a processor over a system bus. In some examples, the code may direct the processor to perform the steps of the current method as described with respect to FIGS. 3, 4, and 6.

The computer-readable medium 500 can include instructions to collect feedback from a physical (PHY)-layer of a client at a plurality of access points 110, before the client is associated with any one of the plurality of access points 110. In an example, instruction for collecting feedback can be in response to the computer-readable medium 500 sending null data packets from the access point 110 to trigger the return of the acknowledgement packet from a client 204. In this example, the PHY-layer feedback may include channel state information, obtained through an acknowledgement packet.

The computer-readable medium 560 can include instructions to select an access point 110 using a calculated orthogonality of signals calculated from the PHY-layer feedback. In an example, the orthogonality value can be calculated with a signal space distribution that can be estimated from the PHY-layer feedback. The computer-readable medium 500 can include instructions to instruct the selected access point 110 to serve the client 204, wherein the selected access point 110 serves a client group concurrently using preceding.

The block diagram of FIG. 5 is not intended to indicate that the computer-readable medium 500 is to include the components or modules shown in FIG. 5. Further, any number of additional components may be included within the computer-readable medium 500, depending on the details of the end to end QoS technique and in-band communication described herein.

Figure 6:
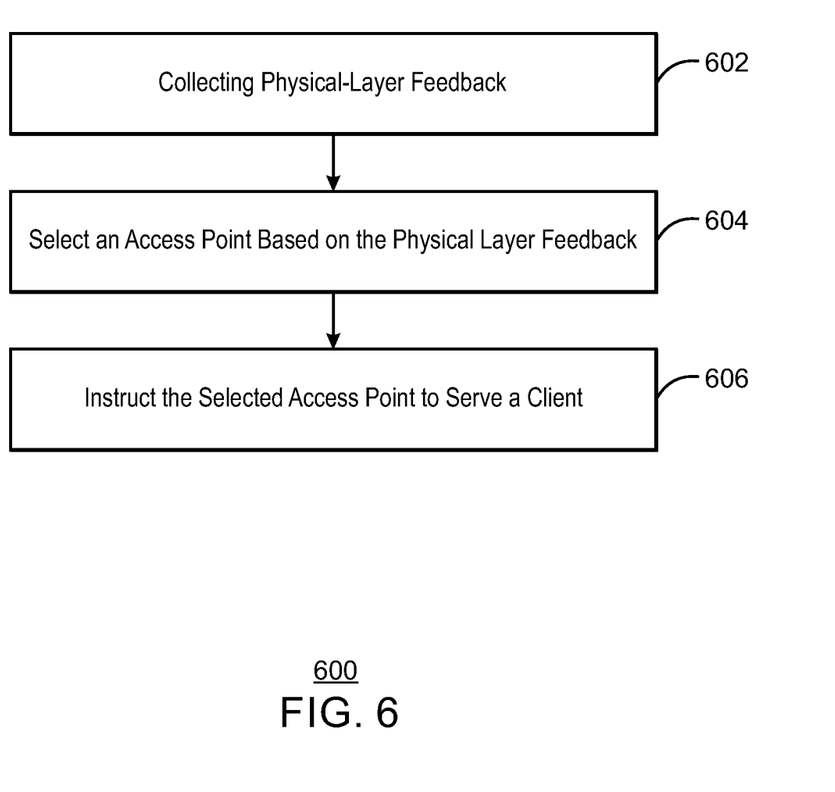
FIG. 6 is flow diagram of an example method for selecting an access point for a wireless network.

FIG. 6 is flow diagram of an example method 600 for selecting an access point for a wireless network. The method 600 begins at block 602, with the controller collecting PHY-layer feedback from a client with an access point before the client is associated with the access point. The PHY-layer feedback may include channel state information. The collection of information may have been triggered by the controller 302 sending null data packets from the access point 110 to trigger the return of an acknowledgement packet from a client 204. In an example, the acknowledgment packet may include the channel state information that the controller can use to calculate a signal space distribution.

At block 604, the controller can select an access point using a client channel correlation value calculated based on the feedback collected from the PHY layer. In an example, the client channel correlation value is calculated with a signal space distribution that is estimated from the feedback. The client channel correlation value can also be calculated from client signal strength, traffic load, and from the feedback.

At block 606, the controller can instruct the selected access point to serve the client 204, wherein the selected access point serves a client group concurrently using precoding. Examples of a network or client group using precoding or beamforming includes service using multi-user multiple input multiple output (MU-MIMO) technology, which supports multiple concurrent streams to a groups of clients associated with an access point.

Figure 7:
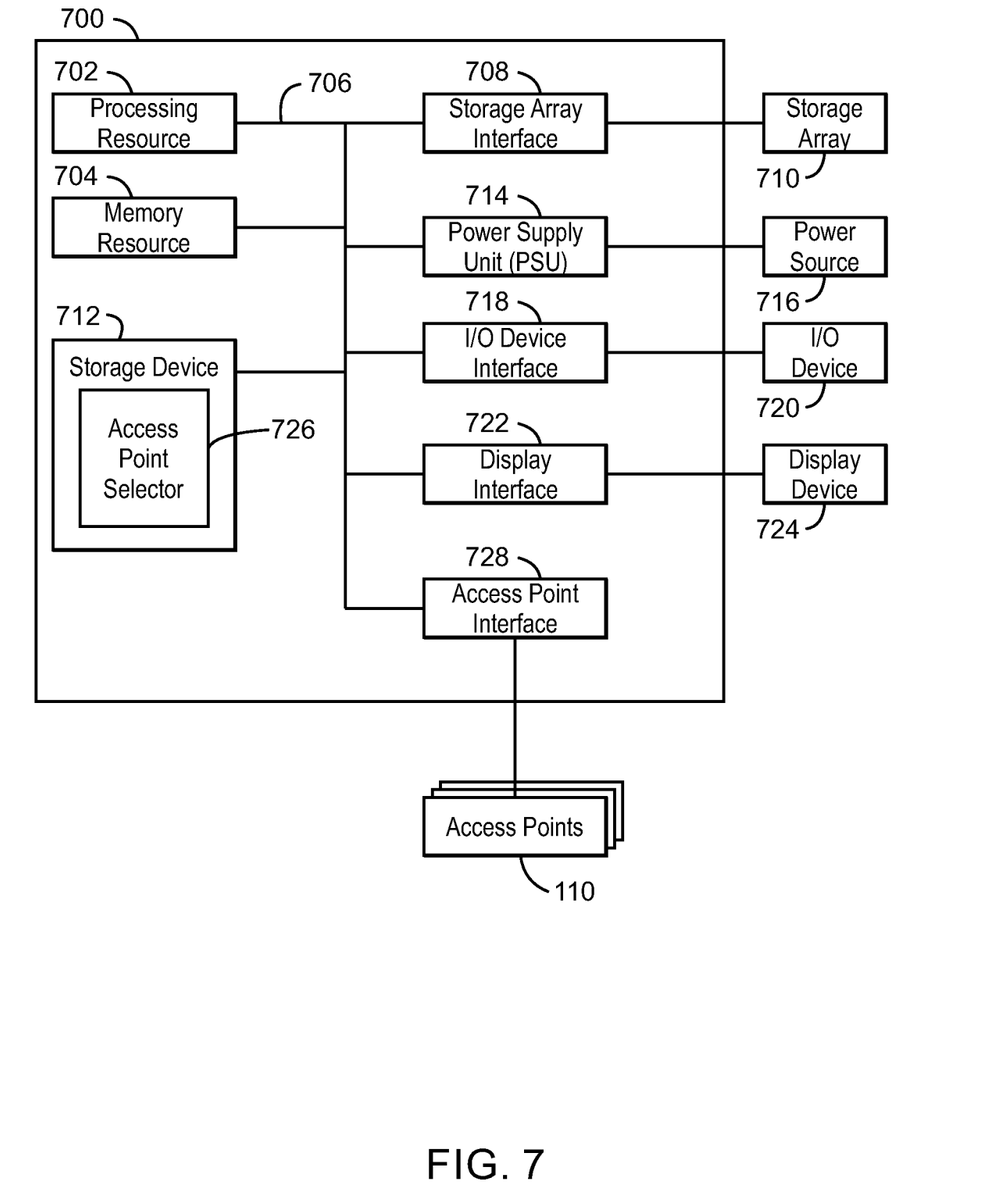
FIG. 7 is an example of a computing system for selecting an access point with physical layer information.

FIG. 7 is an example of a computing system for selecting an access point with physical layer information. Like numbered items are as described in FIG. 1.

The computing device 700 may be, for example, an access point controller, a server, a laptop computer, desktop computer, ultrabook, tablet computer, mobile device, among others. The computing device 700 may include a processing resource 702 such as a central processing unit (CPU) that is configured to execute stored instructions, as well as a memory resource 704 that stores instructions that are executable by the processing resource 702. The processing resource 702 may be coupled to the memory resource 704 by a bus 706. The processing resource 702 can be a single core processor, a multi-core processor, a computing cluster, or any number of other configurations. Furthermore, the computing device 700 may include more than one processing resource 702. The processing resource 702 can also connect through a storage array interface 708 to external storage arrays 770 by the bus 706. The storage array 710 can be an external system or array of systems that are hosting its own guest virtual machines or interacting with the virtual machines of the computing device 700.

The computing device 700 may also include a storage device 712. The storage device 712 is a non-volatile storage device such as a hard drive, an optical drive, a thumbdrive, an array of drives, or any combinations thereof. The memory resource 704 can include random access memory (RAM), flash memory, or any other suitable memory systems. For example, the memory resource 704 may include dynamic random access memory (DRAM).

The computing device 700 and its components may be powered by a power supply unit (PSU) 714. The processing resource 702 may be coupled to the PSU through the bus 706 which may communicate control signals or status signals between then processing resource 702 and the PSU 714. The PSU 714 may be further coupled to a power source 716. The power source 716 can be a supply external to the computing device 700, internal power supply, such as a battery, or both, such as an external power source with a battery backup. In examples with a power source 716 that includes a power source backup, the processing resource 702 can control the functioning of the backup over a bus 706.

The processing resource 702 may also be connected through the bus 706 to an input/output (I/O) device interface 718 configured to connect the computing device 700 to one or more I/O devices 720. The I/O devices 720 may include, for example, a keyboard and a pointing device, wherein the pointing device may include a touchpad or a touchscreen, among others. The I/O devices 720 may be built-in components of the computing device 700 or may be devices that are externally connected to the computing device 700.

The processing resource 702 may be linked through the bus 706 to a display interface 722 configured to connect the computing device 700 to a display device 724. The display device 724 may include a display screen that is a built-in component of the computing device 700. The display device 724 may also include a computer monitor, television, or projector, among others, that is externally connected to the computing device 700 or built into the computing device 700, for example, in a laptop or tablet.

The computing device 700 also includes an access point selector 726, to provide instructions that when executed by the processing resource 702 receive information to enact the techniques discussed herein. This information can arrive through an access point interface 728 from access points 110. As disclosed herein, the access point selector 726 can instruct the processing resource 702 to collect information including incoming PHY-layer feedback from a client at one of the access points 110 before the client is associated with one of the access points 110. Using this PHY-layer feedback, an access point 110 can be selected using a client channel correlation value calculated from the PHY-layer feedback.

The access point selector 726 may instruct the processing resource 702 to send out null data packets from the computing device 700 through the access points 110 to trigger the return of the acknowledgement packets from clients within range to obtain PHY-layer feedback. In an example, the PHY-layer feedback is channel state information that is obtained through an acknowledgement packet originally sent from a client in response to the null packet sent from the computing device 700.

The block diagram of FIG. 7 is not intended to indicate that the computing device is to include all of the components shown in FIG. 7. Further, the computing device 700 may include any number of additional components not shown in FIG. 7, depending on the details of the specific implementation.

While the present techniques may be susceptible to various modifications and alternative forms, the examples discussed above have been shown by way of example. It is to be understood that the technique is not intended to be limited to the particular examples disclosed herein. Indeed, the present techniques include all alternatives, modifications, and equivalents falling within the scope of the appended claims.

What is claimed is:

1. A system to select an access point for a wireless network, the system comprising:
   a processing resource; and
   a memory resource storing machine readable instructions that, when executed, cause the processing resource to:
      direct each of a plurality of access points to send probing frames to a set of one or more clients including a first client;
      collect feedback from a physical (PHY)-layer of each of the one or more clients at the plurality of access points based on responses to the probing frames that are received by each of the plurality of access points from the one or more clients, wherein the PHY-layer feedback is to be collected by the plurality of access points before the one or more clients are associated with any one of the plurality of access points; and
      select an access point of the plurality of access points for the first client using a client channel correlation value calculated for each of the plurality of access points with a signal space distribution that is estimated from the PHY-layer feedback from the one or more clients collected at each of the plurality of access points, wherein the channel correlation value for each access point quantifies and compares a signal overlap from different client signals at the access point, wherein the selected access point is to serve the first client and one or more other clients of a client group concurrently using precoding, and
      wherein the signal space distribution comprises a quantified distribution of how the different client signals overlap in space based on the comparison of signal overlap from the different client signals.

2. The system of claim 1, wherein the client channel correlation value for each of the plurality of access points is calculated from client signal strength, traffic load, and the PHY-layer feedback.

3. The system of claim 1, wherein the PHY-layer feedback includes channel state information.

4. The system of claim 1, wherein the responses to the probing frames include one or more acknowledgement packets.

5. The system of claim 4, wherein the probing frames comprise null data packets from each of the plurality of access points to trigger return of the acknowledgement packets.

6. A method to select an access point for a wireless network, comprising:
   directing each of a plurality of access points to send probing frames to a set of one or more clients including a first client;
   collecting feedback from a physical (PHY)-layer of each of the one or more clients at the plurality of access points based on responses to the probing frames that are received by each of the plurality of access points from the one or more clients, wherein the PHY-layer feedback is to be collected by the plurality of access points before the one or more clients are associated with any one of the plurality of access points;
   selecting an access point of the plurality of access points for the first client using a client channel correlation value calculated for each of the plurality of access points with a signal space distribution that is estimated from the PHY-layer feedback from the one or more clients collected at the plurality of access points, wherein the client channel correlation value for each access point quantifies and compares a signal overlap from different client signals at the access point; and
   instructing the selected access point to serve the first client, wherein the selected access point is to serve the first client and one or more other clients of a client group concurrently using precoding, and
   wherein the signal space distribution comprises a quantified distribution of how the different client signals overlap in space based on the comparison of signal overlap from the different client signals.

7. The method of claim 6, wherein the client channel correlation value for each of the plurality of access points is calculated from client signal strength, traffic load, and the PHY-layer feedback.

8. The method of claim 6, wherein the PHY-layer feedback includes channel state information.

9. The method of claim 6, wherein the responses to the probing frames include one or more acknowledgement packets.

10. The method of claim 9, wherein the probing frames comprise null data packets from each of the plurality of access points to trigger return of the acknowledgement packets.

11. A non-transitory computer-readable medium having program instructions to select an access point for a wireless network, wherein the program instructions are executable by a processor to:
   direct each of a plurality of access points to send probing frames to a set of one or more clients including a first client;
   collect feedback from a physical (PHY)-layer of each of the one or more clients at the plurality of access points based on responses to the probing frames that are received by each of the plurality of access points from the one or more clients, wherein the PHY-layer feedback is to be collected by the plurality of access points before the one or more clients are associated with any one of the plurality of access points;
   select an access point of the plurality of access points for the first client using a client channel correlation value calculated for each of the plurality of access points, the client channel correlation value being calculated with a signal space distribution that is estimated from the PHY-layer feedback from the one or more clients collected at the plurality of access points, wherein the client channel correlation value for each access point quantifies and compares a signal overlap from different client signals at the access point; and
   instruct the selected access point to serve the first client, wherein the selected access point is to serve the first client and one or more other clients of a client group concurrently using precoding, and
   wherein the signal space distribution comprises a quantified distribution of how the different client signals overlap in space based on the comparison of signal overlap from the different client signals.

12. The computer-readable medium of claim 11, wherein the probing frames comprise null data packets from each of the plurality of access points to trigger return of acknowledgement packets, wherein the PHY-layer feedback includes channel state information, and wherein the channel state information is obtained through the acknowledgement packets.

* * * * *